Oct. 25, 1955    E. V. MURPHREE ET AL    2,721,889
OLEFIN POLYMERIZATION PROCESS
Filed July 28, 1950
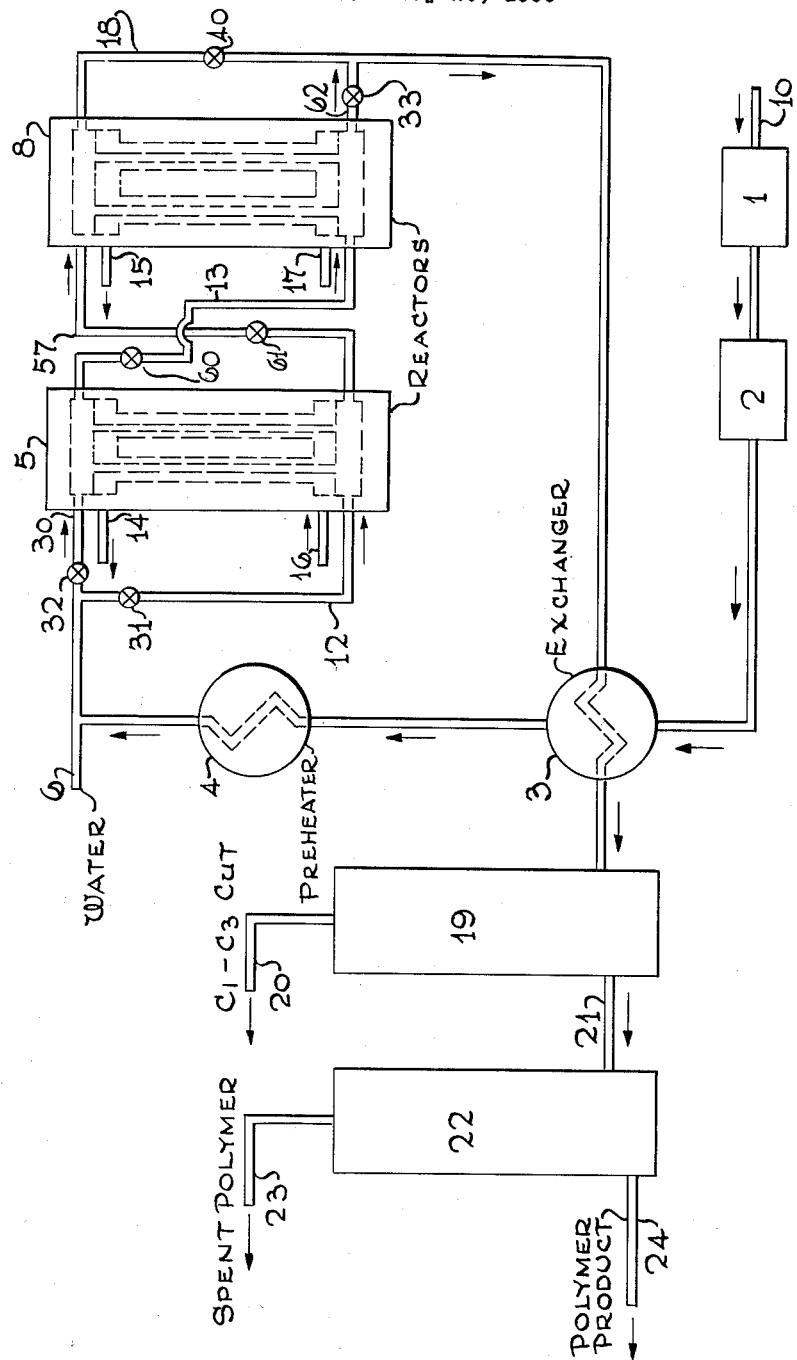
Eger V. Murphree
Kenneth K. Kearby    Inventor
By W. V. Heilman    Attorney

United States Patent Office 2,721,889
Patented Oct. 25, 1955

2,721,889

OLEFIN POLYMERIZATION PROCESS

Eger V. Murphree, Summit, and Kenneth K. Kearby, Cranford, N. J., assignors to Esso Research and Engineering Company, a corporation of Delaware Application July 28, 1950, Serial No. 176,298

6 Claims. (Cl. 260—683.15)

The present invention is concerned with the polymerization of olefins and is more particularly directed toward an improved method of contacting the olefin feed streams with the polymerization catalyst. In accordance with the present invention, the polymerization catalyst is disposed in a suitable reactor and at least during a part of the cycle an upflow operation is carried out in the reactor. A preferred method of operation is to utilize an alternating upflow and downflow operation.

It is well known in the art to treat olefins and olefin-containing streams with various catalysts, as for example, with acids of phosphorous in order to polymerize the olefins to higher boiling hydrocarbon constituents. In general, the feed streams comprise normally gaseous olefins, such as ethylene, propylene, butylenes, pentylenes and mixtures thereof, which are polymerized to hydrocarbon constituents which boil in the range below about 420° F. Although 100% olefinic streams may be utilized as feed stocks, it is generally preferred to have paraffinic diluents present in a conncentration in the range of from about 40% to 90% by weight in order to reduce the formation of carbonaceous deposits on the catalyst and to provide better temperature control in the catalyst bed. The phosphoric acid in the catalyst is usually deposited on solid carriers, as for example, diatomaceous earth, silica gel, and the like. In general, these catalysts are satisfactory for securing the polymerization of the olefins in the feed stream. However, there exist certain inherent disadvantages with respect to their use in that their structural strength is relatively weak, resulting in disintegration of the catalysts and premature failures. This disintegration of the catalyst is particularly harmful in fixed bed types of operations wherein the catalyst is generally disposed in relatively long tubular elements having relatively small diameters.

It is well known that solid, phosphoric acid type olefin polymerization catalysts tend to soften and disintegrate in conventional chamber and tubular olefin polymerization units. The loss of mechanical strength with resultant disintegration causes pressure build up in the unit and poor contacting due to feed channeling within the bed. Inasmuch as the mechanical failure of these catalysts frequency necessitates catalyst replacement, even though intrinsic activity is unaffected, it is highly important that every effort be made to avoid mechanical failure of the catalyst. As the catalyst disintegrates the fines tend to be washed downwardly in the reaction zone tending to accumulate at the bottom. As the accumulation of fine catalysts particles builds up, the pressure drop across the reactor builds up thus adversely affecting operating conditions of the entire reactor. These disadvantages, as well as others, are overcome by the present invention wherein at least during a part of the cycle, the feed gases contact the catalyst in an upflow operation.

The present invention may be readily understood by reference to the diagrammatical drawing illustrating an embodiment of the same. Referring specifically to the drawing illustrating a fixed bed chamber and tubular operation, feed gases comprising $C_3$ and $C_4$ olefins are introduced into the system by means of line 10. Hydrogen sulphide is removed from the gases in zone 1 and mercaptans removed in zone 2 by any suitable means. Other feed impurities may be removed in these or additional treating stages. The feed gases, free of harmful impurities, are passed through heat exchanger zone 3, preheated to the desired temperature in zone 4 and then introduced into the bottom of reactor 5 by means of line 12. Water may be added to the feed gases in order to help maintain catalyst activity by means of line 6. The feed gases flow upwardly in zone 5; are removed from the top of zone 5 by means of line 13 and introduced into the bottom of reactor 8 by means of line 13. Since the polymerization reaction is highly exothermic, and since reactor temperature control is very important in terms of catalyst life and polymer quality, the desired temperature is maintained in the reactors by means of water circulation which is introduced into reactors 5 and 8 by means of lines 16 and 17 respectively. Water or steam is withdrawn from the respective reactors by means of lines 14 and 15. The tubes of reactors 5 and 8 contain a suitable polymerization catalyst, as for example, phosphoric acid deposited on a silica gel carrier.

The reaction product is removed from the top of reactor 8 by means of line 18, passed through heat exchanger 3 and introduced into stabilization zone 19. Hydrocarbons boiling in the range of propane and lower are removed overhead from stabilizer 19 by means of line 20 while the higher boiling constituents are removed by means of line 21 and introduced into a debutanizer unit 22. Butane is removed overhead from zone 22 by means of line 23 while the higher boiling constituents are removed by means of line 24. Zones 19 and 22 may comprise any suitable number and arrangement of stages. This polymer product stream removed by means of line 24 may be fractionated in order to secure the desired boiling range product or further refined and handled as desired.

As pointed out heretofore, the invention comprises employing upflow operation at least during a portion of the cycle. A preferred adaptation is to employ an upflow operation alternating with a downflow operation. If this type of operation be carried out, the feed gases, after being introduced into zone 5 by means of line 12 for a fixed period of time, are then introduced into zone 5 by means of line 30 for a fixed period of time. The desired method of introducing these gases is controlled by valves 31 and 32 positioned in lines 12 and 30 respectively and by means of valves 60 and 61 positioned in lines 13 and 57 respectively. The gases flow downwardly in zone 5 and are withdrawn from the bottom of the zone by means of line 57 and introduced into the top of zone 8. The reaction product is withdrawn from the bottom of zone 8 by means of line 62 and handled as hereinbefore described.

The present invention is broadly concerned with a polymerization process wherein upflow of the feed gases in the reaction zone is utilized at least a portion of the time. The operation is adapted to be used with conventional type catalysts, as for example, phosphoric acid deposited on kieselguhr and other solid carriers. By operating as described a more uniform deposition of carbon will be secured throughout the catalyst bed. This will result in a longer life of the catalyst and will also result in appreciably less plugging difficulties. For instance, in conventional tubes, the tube lengths may be from 10 to 40 ft. in length and the entire tube of catalyst may have to be replaced due for instance to plugging occurring within a relatively short space of the bottom of the tube.

The invention is particularly adapted for use when utilizing a polymerization catalyst comprising phosphoric acid catalyst supported on silica gel which has been calcined prior to impregnation. The catalyst may also comprise from about .5 to 5% of a salt of copper, nickel, manganese, cobalt iron, cadmium and the like. In the preparation of the catalyst the calcination temperature of the silica gel used prior to impregnating it with phosphoric acid should not be lower than about 400° F. nor higher than about 1400° F. A preferred temperature of calcining or drying the silica gel before impregnation is in the range from about 800 to 1250° F.

The silica gel may be prepared by any conventional procedure. One method is to add a solution of sodium silicate to sulfuric acid resulting in the formation of a sol which in turn sets to a gel. The gel will contain from about 80 to 90% of water and is washed either before or after drying in order to free it of sodium sulfate prior to calcining. After calcining the silica gel, preferably at a temperature in the range from 800° F. to 1250° F., the calcined gel is pulverized and mixed in a ball mill with phosphoric acid.

Various acids of phosphorous may be used, as for example, orthophosphoric acid and pyrophosphoric acid. The promoter, if used, may be a salt, as for example, the phosphate, the nitrate, the sulphate, the chloride, or the fluoride, or it may be the oxide of the metals enumerated above.

The amount of phosphoric acid employed with respect to the silica gel may be varied appreciably. However, it is preferred that the concentration of the phosphoric acid be in the range from about 50 to 90% by weight of total catalyst, preferably in the range from 75 to 85% by weight calculated as $H_3PO_4$. The amount of promoter salt may vary appreciably if utilized, as for example, in the range from about 1 to 10% by weight.

The feed streams for the polymerization operation are preferably normally gaseous hydrocarbons containing olefins. Various diluents may be present. A preferred feed stream comprises one which contains from about 30 to 50% of olefins. Although the polymerization temperature may be in the range from about 300° F. to 900° F., a preferred polymerization temperature is in the range from about 400° F. to 500° F. Polymerization pressures likewise may vary widely, as for example, in the range from about 50 lbs. per square inch gauge to 1500 lbs. per square inch gauge. Preferred pressures are in the range from about 300 to 1000 lbs. per square inch gauge. Feed rates may vary depending upon other operating conditions. In general, the feed rates are in the range from about .5 to 15 volumes of liquefied gas per volume of catalyst per hour.

In order to maintain the activity of the catalyst at high levels for long operating periods, it may be necessary to inject continuously or at frequent intervals into the reactor containing the catalyst, small amounts of water in order to prevent dehydration of the catalyst. This water may be added in one of several ways. It may, if desired, be pumped directly into the inlet of the catalyst bed or metered streams may be employed. Another alternative is to contact the liquefied feed with water maintained at a suitable temperature to dissolve in the feed the desired quantity of water. If the latter method is employed, the water for feed saturation is usually held at a temperature of from about 90° F. to 180° F. depending on operating conditions. An amount of water equivalent to from .1 to 2 gallons of water per thousand gallons of feed is usually required.

As pointed out, polymerization reactors containing fixed beds of catalyst generally have a non-uniform temperature distribution with a peak temperature in the middle portion of the catalyst bed. As the catalyst ages, the position of the peak temperature moves down the bed in a downflow unit. In order to maintain the activity of silica-phosphoric acid type catalysts or other phosphoric acid catalysts, it is necessary to maintain a given water content in the feed as required by the hottest portions of the catalyst. This water content results in excessive hydration of the colder portions of the catalyst, especially of the exit portion. The increase in catalyst hydration is indicated by an increase in its content of "free phosphoric acid." The free phosphoric acid is that which can be titrated after a three minute extraction with water at 60–75° F.

In examining used catalysts removed from different portions of a catalyst bed, it has been found that the catalyst at the exit end of the reactor has gained the most in free acid content. The gain in free acid content is accompanied by a loss of catalyst strength. An example of the variation of free acid content with position in the catalyst bed is as follows:

| Bed Position | Feed Inlet | 6'' | 10'' | 14'' | 18'' (bottom) |
|---|---|---|---|---|---|
| Percent free $H_3PO_4$ | 25.1 | 23.6 | 24.3 | 29.3 | 35.7 |

Reversing the flow through the reactor will reverse this distribution and it is possible to prevent such a wide variation in the free acidity of the catalyst from ever existing by alternating the direction of flow at sufficiently frequent intervals. The alternating direction of flow results in maintaining a smaller average temperature differential between the coldest and hottest portions of the catalyst and therefore in an operation which permits better control of catalyst hydration. Such an operation results in a longer catalyst life and in maintaining a more constant polymer yield. The periods or cycles of operation at each condition can vary widely from an hour to 24 hours and up to a week if desired. With large amounts of feed which carry large amounts of water, a period of 1 hour to 1 day may be used. Preferred periods are from about 1 to 3 hours.

Having described the invention, it is claimed:

1. In the polymerization of olefins wherein said olefins are continuously passed through a fixed bed of catalyst comprising a phosphoric acid supported on a solid carrier at polymerization conditions and in the presence of water to maintain catalyst activity, and wherein said catalyst loses mechanical strength after prolonged operating periods due to the existence of non-uniform temperature and catalyst hydration levels in said bed, the improvement which comprises alternately reversing the direction of flow of said olefins through said bed in time cycles of at least one hour whereby more uniform temperature and catalyst hydration levels are maintained therein said polymerization conditions including a temperature in the range of about 300° to 900° F. and pressures above about 300 p. s. i.

2. Process as defined by claim 1 wherein the temperature maintained in said bed is in the range from about 400 to 500° F. and wherein the pressure is in the range from about 300 to 1000 lbs. per sq. in. gauge.

3. Process as defined by claim 2 wherein said feed stream is alternately passed upwardly and downwardly through said bed for time cycles in the range of about one hour to one week.

4. Process as defined by claim 3 wherein said feed stream is passed upwardly through said bed for a period of from 1 to 3 hours and then downwardly through said bed for a period of from about 1 to 3 hours.

5. Process as defined by claim 1 wherein said solid carrier comprises silica gel.

6. In the polymerization of normally gaseous olefins wherein said olefins are continuously passed through a bed of solid phosphoric acid catalyst under polymerizing conditions in the presence of an activating amount of water and wherein non-uniform carbon formation on said catalyst occurs throughout said bed, the improvement which comprises alternately passing said olefins upwardly and downwardly through said bed in time cycles sufficient to cause substantially uniform carbon formation throughout said bed said time cycles each being in the range of about one hour to one week, and said polymerization conditions including a temperature in the range of about 300° to 900° F. and pressures above about 300 p. s. i.

References Cited in the file of this patent

UNITED STATES PATENTS

| | | |
|---|---|---|
| 2,150,924 | Houdry | Mar. 21, 1939 |
| 2,209,040 | Simpson et al. | July 23, 1940 |
| 2,245,143 | Gerhold | June 10, 1941 |
| 2,290,845 | Voorhees | July 21, 1942 |
| 2,293,353 | Moravec et al. | Aug. 18, 1942 |
| 2,356,700 | Rupp et al. | Aug. 22, 1944 |
| 2,486,533 | Mayland et al. | Nov. 1, 1949 |